July 6, 1965

K. A. SCHAFER 3,193,438

IMPREGNATED FOAMED RESIN AND USE THEREOF

Filed Aug. 16, 1961

INVENTOR.
KENNETH A. SCHAFER
BY
Harry B. Keck
ATTORNEY

United States Patent Office 3,193,438
Patented July 6, 1965

3,193,438
IMPREGNATED FOAMED RESIN AND
USE THEREOF
Kenneth A. Schafer, Cedarburg, Wis., assignor to Freeman Chemical Corporation, Port Washington, Wis., a corporation of Delaware
Filed Aug. 16, 1961, Ser. No. 131,839
16 Claims. (Cl. 161—89)

This invention relates to impregnated foamed resins, and particularly to open, connected cell foamed polyurethane resins impregnated with ethylenically unsaturated monomeric liquids. The present impregnated resins are especially useful in the fabrication of laminated articles from thermosetting resinous compositions.

Foamed polyurethane resins, according to the present invention, are impregnated with polymerizable monomers containing ethylenic unsaturation, e.g., styrene, vinyl, toluene, acrylate and methacrylate esters, diallyl phthalate and the like. The impregnated foamed polyurethane resins become isotropically expanded as a result of the impregnation and acquire increased drapability for use in laminating applications.

As described in copending patent applications, sheets of foamed polyurethane having open, connected cellular structure are useful as a layer in a laminated article, for example, laminated reinforced glass fiber sheets, furniture, and molded parts of various types.

Where the laminated article possesses compound curvatures, the drapability of the foamed polyurethane sheets become particularly important, as in the manufacture of furniture, possessing compound curvatures. The stretchability and compressibility of the foamed polyurethane resins will compensate for considerable curvature without unsightly folding, but the increased drapability is a desirable feature.

In the present utilization, foamed polyurethane sheets are impregnated with polymerizable monomers having ethylenic unsaturation. The impregnated sheets are thereafter further impregnated with thermosetting resinous compositions in liquid form, i.e., those thermosetting compositions which readily cross-link through monomers possessing ethylenic unsaturation. Such thermosetting resinous compositions include unsaturated polyester resins and epoxy resins.

By maintaining the impregnated foamed resin under some compression during the cure of the thermosetting resinous composition, the compressed foamed resin remains within the resulting laminate after cure and, where the thermosetting resin is opaque, the foamed resin provides an attractive grain presentation on the exposed surface of the laminated article, as described in copending application S.N. 131,835 filed August 16, 1961. Where, on the other hand, the thermosetting resinous composition is colorless or at least translucent, a neutral colored foamed polyurethane sheet will "disappear" within the cured resin so that the details of the underlying element of the laminate can be observed, as described in copending application S.N. 131,838 filed August 16, 1961.

The present invention is not concerned with the specific laminate formation so much as it is with the particular impregnated foamed polyurethane or similar foamed resinous material which is utilized in the laminated articles.

By impregnating the foamed resin sheet with the ethylenically unsaturated monomers, substantial isotropic expansion of the sheet occurs which is accompanied by some weakening of the sheet. The sheet may be dipped in a liquid bath of the ethylenically unsaturated monomer and then drawn through wringer rolls to eliminate most of the monomer. The residual monomer will cause the sheet to expand to nearly twice its original area and to expand correspondingly in thickness.

The relatively dry impregnated sheet (containing residual ethylenically unsaturated monomeric liquid) may subsequently be impregnated with thermosetting resinous compositions. Upon compression of the foamed resin, thus doubly impregnated, the thermosetting resinous composition can be cured through the presence of suitable polymerization catalysts (e.g., benzoyl peroxide in the case in the unsaturated polyester resins) to a hardened thermoset condition with the compressed foamed resin secured within the cured thermosetting resinous composition.

In an alternative utilization of the impregnated foamed resin of this invention, the sheets may be stuffed into cavities of structural elements (e.g., into armature slots of electrical motors and generators) and thereafter be saturated with the thermosetting resinous composition in liquid form. The thermosetting resinous composition is allowed to cure while the impregnated foamed resin is maintained within the cavity. The structural cavity is readily filled thereby.

The principal object of this invention is to provide suitably impregnated foamed polyurethane sheets for use in laminate fabrication with thermosetting resinous compositions.

Another object of this invention is to provide suitably impregnated foamed polyurethane sheets for use in filling structural cavities.

A further object of this invention is to provide laminated articles embodying thermosetting resinous compositions and compressed sheets of foamed resin having ethylenically unsaturated monomers impregnated therein.

These and other objects and advantages of the present invention will become apparent from the following detailed description by reference to the accompanying drawings in which.

FOAMED RESINS

Figure 1:
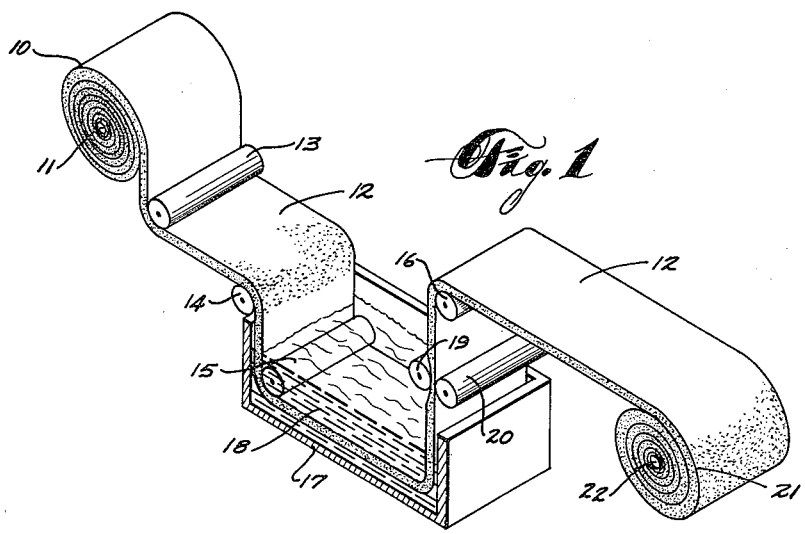
FIGURE 1 is a schematic illustration of one means for impregnating the foamed resinous material of this invention.

The foamed resinous material, as heretofore mentioned, is preferably foamed polyurethane having open, connected cells. Other materials which have been investigated have been found to be undesirable for want of one or more of the following features:

The foamed resin must possess:
(1) Open celled configuration;
(2) Flexibility;
(3) Elasticity;
(4) Ready compressibility; and
(5) Wettability with the liquid thermosetting resinous composition.

Polyurethane foam is eminently satisfactory in the above-listed properties where the thermosetting resinous composition is unsaturated polyester resin or epoxy resin.

The preferred foamed resin has open, connected cells of substantially uniform diameter in the range of 0.001 to 0.5 inch. The material is preferably provided in sheet form having a thickness from about 0.05 to 2.0 inches in its uncompressed form. Such sheets may be readily compressed to a minor fraction of their uncompressed thickness. The cells of the foamed resin must be open and connected. Polyurethane foams having open, connected cell structures have been described in U.S. Patent 2,961,710 and Canada Patent 620,248. The cell-wall breakdown described in these references is accomplished through the action of organic solvents and inorganic reagents acting upon the customary closed-cell polyurethane foams.

THERMOSETTING RESINS

Unsaturated polyester resins are well-known in the art as a thermosetting resinous composition. Such resinous compositions are widely utilized in the fabrication of furniture, automotive vehicle parts such as fenders and body moldings, boat hulls, machinery cases, machinery covers, helmets and the like. Frequently the unsaturated polyester resins are utilized in combination with fibrous reinforcing materials such as glass fiber mats, glass fiber fabrics, sisal fibers, hog-hair fibers and the like. The unsaturated polyester resins usually are solutions of unsaturated polyesters in a polymerizable monomeric solvent such as styrene, vinyl toluene, acrylates, methacrylates, and the like. The unsaturated polyester itself usually is formed by the esterification of glycols with dicarboxylic acids or acid anhydrides. At least a part of the dicarboxylic acid or acid anhydride contains some ethylenic unsaturation, e.g., maleic acid, maleic anhydride, fumaric acid and the like. Some of the dicarboxylic acid or acid anhydride may be free of ethylenic unsaturation, e.g., phthalic acid, isophthalic acid, terephthalic acid, adipic acid, succinic acid, phthalic anhydride and the like. The unsaturated polyester resin is dissolved in a polymerizable monomer to prepare the customary resinous compositions of the trade. Usually about 20 to 50 parts by weight of styrene and 80 to 50 parts by weight of unsaturated polyester are mixed to formulate a typical unsaturated polyester resinous composition. On heating in the presence of suitable catalysts, such resinous compositions form three-dimensional (thermoset) polymeric bonds. Customarily the resinous compositions contain suitable pigmentation to present an opaque surface when cured. Frequently the resinous compositions contain no pigmentation where transparent (or at least translucent) products are desired, as for example in light-transmissive panels. The precise formulation of the unsaturated polyester resinous compositions forms no part of the present invention.

The impregnation of foamed polyurethane is illustrated in FIGURE 1. A roll 10 of sheet foamed polyurethane having open, connected cells is provided on a hub 11. The sheet 12 is withdrawn from the roll 10 and passed over suitable rollers 13, 14, 15, 16, through a reservoir 17 containing ethylenic unsaturated monomeric liquid such as styrene 18. The foamed polyurethane sheet 12 is readily wettable with the styrene 18 and, in leaving the reservoir 17, is substantially saturated with liquid styrene. A pair of wringer rolls 19, 20 squeezes excess styrene from the sheet 12 as desired. By altering the nip-spacing of the rolls 19, 20, more or less residual styrene may be left in the sheet 12. The impregnated sheet 12 thereafter is re-rolled into a roll 21 mounted on a hub 22.

Figure 2:
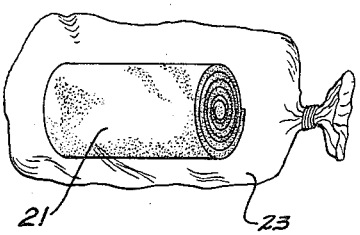
FIGURE 2 is a perspective illustration of a roll of impregnated polyurethane foam sheeting encased in a storage package.

The impregnated sheet of polyurethane foam thus prepared is suitable for use in the present invention. These rolls 21 of suitably impregnated foamed polyurethane sheets may be packaged in a suitable vapor-barrier material such as polyethylene bags as shown in FIGURE 2 wherein the roll 21 of impregnated foamed polyurethane sheet is contained within a polyethylene bag 23.

The amount of ethylenically unsaturated monomeric liquid retained in the foamed polyurethane can be varied from about 0.05 to 5.0 times the weight of the foamed polyurethane according to the particular intended application of the foamed polyurethane.

Figure 3:
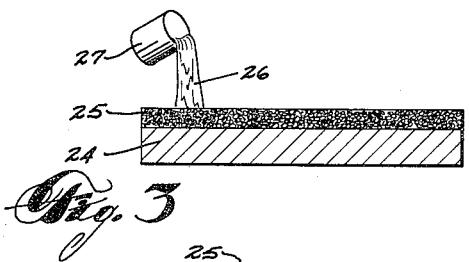
FIGURE 3 is a cross-section illustration of a laminated article prior to curing according to the present invention.
Figure 4:
FIGURE 4 is a cross-section illustration of a laminated article according to this invention after curing.

In the preparation of laminates utilizing the present impregnated foamed polyurethane, a suitable backing sheet 24 is illustrated in FIGURE 3 with the present impregnated sheet 25 of foamed polyurethane positioned thereon. A supply of thermosetting resinous composition 26 such as unsaturated polyester resin or epoxy resin is applied to the impregnated sheet 25 from a container 27. Thereupon the impregnated sheet 25 of foamed polyurethane is compressed as shown in FIGURE 4 and, while under compression, the thermosetting resinous composition is cured through cross-linking or copolymerizing with the impregnated ethylenically unsaturated monomeric liquid. The compressed sheet 25 of foamed polyurethane thus is substantially flattened from its initial uncompressed thickness and is confined in its compressed condition within the hardened, thermoset resin and presents an attractive grain surface where the thermosetting resinous composition is opaque and a clear surface where the thermosetting resinous composition is transparent or translucent.

The presence of the ethylenically unsaturated monomeric liquid which remains on the foamed polyurethane should be taken into consideration in the selection of the thermosetting resinous composition which is used in fabricating these laminated articles. A slightly less quantity of ethylenically unsaturated monomeric solvent will be required in the actual thermosetting resinous composition because of the presence of the residual ethylenically unsaturated monomeric liquid in the impregnated foamed polyurethane.

Figure 5:
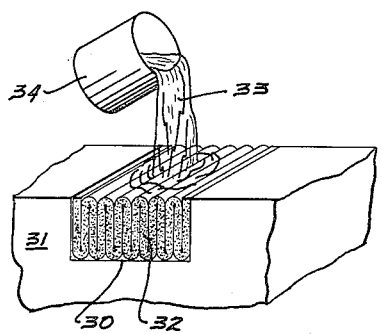
FIGURE 5 is a perspective illustration of a structural cavity containing the impregnated foamed resin of this invention.
Figure 6:
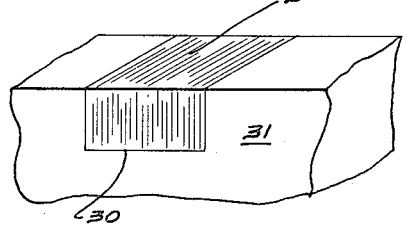
FIGURE 6 is a perspective illustration of the structural cavity of FIGURE 5 after it has been filled with a thermoset resinous mass according to this invention.

The present impregnated foamed polyurethane may be utilized to fill structural cavities such as armature slots in motors and generators. Similarly the present impregnated foamed polyurethane may be used to fill dents in surfaces in the same manner as "body solder" is utilized. The utilization of the present invention for filling a structural cavity is illustrated in FIGURES 5 and 6. As shown in FIGURE 5, a cavity 30 in a structural element 31 is filled initially with the present impregnated foamed polyurethane 32. A supply of thermosetting resinous composition 33 is provided from a container 34 to saturate the impregnated foamed polyurethane. Upon curing of the thermosetting resinous composition 33, a resinous mass 35 is formed within the cavity 30 as a hardened thermoset mass which substantially entirely fills the cavity 30.

EXAMPLES

A sheet of foamed polyurethane having open, connected cells and fabricated according to Canada Patent 620,248, was ⅛-inch thick and 12 inches square. The sheet was dipped in liquid styrene and drawn through a washing-machine wringer. The sheet of polyurethane remained slightly dry to the touch. The original untreated sheet weighed 16.29 grams. After wringing most of the styrene from the dipped sheet, the weight of the impregnated sheet was 48.3 grams. Thus the sheet retained 32 grams of styrene, i.e., about twice its original weight.

The sheet expanded to an approximately square rectangle having sides of 15.5 and 15.75 inches. The thickness also increased. Thus the sheet area increased from its original dry value of 144 square inches to its impregnated value of 244 square inches.

The styrene-impregnated sheet was placed atop a mat of glass fibers. A quantity of commercial unsaturated polyester resinous composition (glycol-maleate-phthalate) in styrene solvent was applied to the impregnated resin and the glass mat. The foam was compressed and the resin allowed to cure. On curing, an attractive laminated sheet was formed. Since the resinous composition was pigmented with white coloring materials, the resulting laminate had a white-grained appearance not unlike that of fine grain leather.

Similar results were obtained when the following ethylenically unsaturated monomers were applied as the impregnants for the open-celled foamed polyurethane:

Vinyl toluene, methyl methacrylate, diallyl phthalate. In all cases, the foamed resin expanded substantially isotropically and possessed, in its expanded form greatly improved drapability with respect to contoured surfaces.

It will be observed that the foamed polyurethane has open, connected cells. The presence of closed cells in the foamed polyurethane is undesirable since it leads to blistering of laminates in which it is used.

The present impregnated sheets of foamed polyurethane can be provided in large rolls for ultimate use by laminating processors or other users of thermosetting resins. So long as the material is kept free from exposure to oxygen, a substantial shelf-life (or storage life) can be expected. This might be accomplished, for example, by storing and shipping the impregnated rolls in vapor barrier containers such as polyethylene bags.

In place of foamed polyurethane, other cellular foamed plastic materials have been found to be unacceptable. For example, foamed cellulose lacks the desired wettability with the thermosetting resinous composition. In laminated articles, the foamed cellulose separates from the thermoset resinous mass. Moreover, the cells of foamed cellulose are not nearly as uniform in average diameter as those of polyurethane. Surface appearance is not especially attractive where cellulose foam is employed. Foamed polyvinyl chloride likewise lacks the desired wettability for the resinous compositions.

In place of the saturated polyester resins as the thermosetting resinous composition, epoxy resins may be employed. These are especially desirable where the laminated articles are to be secured to a metal backing sheet, as, for example, in FIGURE 3, where the backing element 24 is a metal sheet.

I claim:

1. A flexible, resilient, foamed polyurethane sheet having open, connected cells for use in laminating or molding thermoset resinous articles, said sheet being impregnated with an ethylenically unsaturated monomeric liquid which is copolymerizable with a thermosetting resin, the said foamed polyurethane sheet having increased dimensions and greater drapability as a result of the impregnation.

2. A foamed polyurethane sheet of claim 1 being impregnated with from 0.05 to 5.0 times its weight of the said ethylenically unsaturated monomeric liquid.

3. A foamed polyurethane sheet of claim 1 wherein the said liquid is styrene.

4. A foamed polyurethane sheet of claim 1 wherein the said liquid is vinyl toluene.

5. A foamed polyurethane sheet of claim 1 wherein the said liquid is methyl methacrylate.

6. A foamed polyurethane sheet of claim 1 wherein the said liquid is diallyl phthalate.

7. A foamed polyurethane sheet of claim 1 wherein the said cells are of substantially uniform diameter in the range of 0.001 to 0.5 inch.

8. A foamed polyurethane sheet of claim 1 having a uniform thickness from 0.05 to 2.0 inches.

9. A laminated article comprising thermosetting resinous composition cured to a hardened condition while impregnated on a resilient sheet of foamed flexible polyurethane having open, connected cells and having been previously impregnated with an ethylenically unsaturated monomeric liquid which is copolymerizable with a thermosetting resinous composition whereby the said foamed polyurethane has been increased in dimensions and has greater drapability, the said polyurethane having been maintained under compression and thereby substantially flattened from its initial uncompressed thickness while the said thermosetting resinous composition was cured.

10. A resinous mass comprising resilient, flexible, foamed polyurethane having open, connected cells and being impregnated with ethylenically unsaturated monomeric liquid which is copolymerizable with a thermosetting resinous composition and which serves to increase the dimensions and achieve greater drapability for the said polyurethane, the said foamed polyurethane being subsequently impregnated with thermosetting resinous composition which can be crosslinked with the said monomeric liquid, the said thermosetting resinous composition being cured to a hardened thermoset condition while the said foamed resin is maintained under compression and thereby substantially flattened from its initial uncompressed thickness.

11. The method of forming a laminated article which comprises impregnating a sheet of resilient, flexible, foamed polyurethane resin having open, connected cells with an ethylenically unsaturated monomeric liquid which is copolymerizable with a thermosetting resinous composition, whereby the said sheet of polyurethane is increased in dimensions and achieves greater drapability, thereafter impregnating the thus-impregnated sheet with a thermosetting resinous composition in liquid form, compressing the said foamed polyurethane and curing the thermoset resin by cross-linking with the said monomeric liquid while the said polyurethane is substantially flattened from its initial uncompressed thickness.

12. The method of filling a structural cavity which comprises stuffing resilient, flexible, foamed polyurethane into the said cavity, the said foamed polyurethane having open, connected cells and being impregnated with an ethylenically unsaturated monomeric liquid which is copolymerizable with a thermosetting resinous composition whereby the said polyurethane is increased in dimensions and achieves greater drapability, thereafter saturating the said foamed polyurethane with a thermosetting resinous composition in liquid form, and curing the said thermosetting resinous composition by cross-linking with the said monomeric liquid while maintaining the said foamed polyurethane under compression.

13. The laminated article of claim 9 wherein the said thermosetting resinous composition is an unsaturated polyester resin.

14. The resinous mass of claim 10 wherein the said thermosetting resinous composition is unsaturated polyester resin.

15. The method of claim 11 wherein the said thermosetting resinous composition is unsaturated polyester resin.

16. The method of claim 12 wherein the said thermosetting resinous composition is unsaturated polyester resin.

References Cited by the Examiner

UNITED STATES PATENTS

| | | |
|---|---|---|
| 1,591,670 | 7/26 | Fischer. |
| 2,268,160 | 12/41 | Miles. |
| 2,782,458 | 2/57 | Emmert _____ 156—313 |
| 2,863,797 | 12/58 | Meyer. |
| 2,903,389 | 9/59 | Fujita _____ 18—59 |
| 2,924,546 | 2/60 | Shaw. |
| 2,927,876 | 3/60 | Hoppe et al. _____ 156—159 X |
| 2,957,832 | 10/60 | Gmitter et al. |
| 2,961,710 | 11/60 | Stark. |
| 3,006,799 | 10/61 | Adams et al. _____ 161—88 X |
| 3,025,200 | 3/62 | Powers. |
| 3,046,180 | 7/62 | Diehl et al. _____ 156—332 |
| 3,108,030 | 8/63 | Taylor _____ 156—332 |

FOREIGN PATENTS

| | | |
|---|---|---|
| 582,122 | 8/59 | Canada. |

OTHER REFERENCES

Firestone Retread Shop Manual, pg. F 12, dated August 15, 1945.

EARL M. BERGERT, *Primary Examiner.*

CARL F. KRAFFT, *Examiner.*